United States Patent
Fourman et al.

(10) Patent No.: US 11,061,958 B2
(45) Date of Patent: Jul. 13, 2021

(54) SYSTEMS AND METHOD OF GENERATING CUSTOM MESSAGES BASED ON RULE-BASED DATABASE QUERIES IN A CLOUD PLATFORM

(71) Applicant: JETBLUE AIRWAYS CORPORATION, Long Island City, NY (US)

(72) Inventors: Daniel L. Fourman, Queens, NY (US); Ron Fazah, Queens, NY (US); Ramakrishnan Ramaswamy, Queens, NY (US); Nestor Acha, Queens, NY (US); Prasanna S. Venkatesh, Queens, NY (US)

(73) Assignee: JETBLUE AIRWAYS CORPORATION, Long Island City, NY (US)

( * ) Notice: Subject to any disclaimer, the term of this patent is extended or adjusted under 35 U.S.C. 154(b) by 0 days.

(21) Appl. No.: 17/018,073

(22) Filed: Sep. 11, 2020

(65) Prior Publication Data

US 2021/0149950 A1 May 20, 2021

Related U.S. Application Data

(60) Provisional application No. 62/935,449, filed on Nov. 14, 2019.

(51) Int. Cl.
*G06F 16/00* (2019.01)
*G06F 7/00* (2006.01)
(Continued)

(52) U.S. Cl.
CPC .............. *G06F 16/61* (2019.01); *G06F 9/542* (2013.01); *G06F 16/632* (2019.01);
(Continued)

(58) Field of Classification Search
CPC ...... G06F 16/61; G06F 16/638; G06F 16/632; G06F 40/56; G06F 9/542; G16Y 10/75
(Continued)

(56) References Cited

U.S. PATENT DOCUMENTS

| | | |
|---|---|---|
| 6,104,989 A | 8/2000 | Kanevsky et al. |
| 7,412,376 B2 | 8/2008 | Florencio et al. |

(Continued)

FOREIGN PATENT DOCUMENTS

| | | |
|---|---|---|
| JP | 2010197882 A | 9/2010 |
| KR | 1020130089934 A | 8/2013 |

(Continued)

*Primary Examiner* — Usmaan Saeed
*Assistant Examiner* — Raquel Perez-Arroyo
(74) *Attorney, Agent, or Firm* — Mayer Brown LLP

(57) ABSTRACT

Systems and methods are disclosed for generating messages in a cloud platform. One method comprises storing a collection of audio files and destination information identifying location information corresponding to plurality of different geographic locations where a plurality of edge devices are located and grammar information including language-specific rules, receiving messages from one or more of a plurality of requesting devices, the messages including a first type of message and a second type of message, generating an action list, determining an available time slot at a first geographic location of a first edge device when the first edge device is available to render an announcement, retrieving, using the grammar information associated with the second type of destination information included in the action list, an audio file from the collection of audio files stored; and transmitting the audio file and the action list to the first edge device to render an announcement.

20 Claims, 7 Drawing Sheets

(51) Int. Cl.
 *G06F 16/61*  (2019.01)
 *G06F 40/56*  (2020.01)
 *G06F 16/632*  (2019.01)
 *G16Y 10/75*  (2020.01)
 *G06F 16/638*  (2019.01)
 *G06F 9/54*  (2006.01)

(52) U.S. Cl.
 CPC ............ *G06F 16/638* (2019.01); *G06F 40/56* (2020.01); *G16Y 10/75* (2020.01)

(58) Field of Classification Search
 USPC .......................................................... 707/722
 See application file for complete search history.

(56) References Cited

U.S. PATENT DOCUMENTS

| | | |
|---|---|---|
| 8,359,020 B2 | 1/2013 | Lebeau et al. |
| 9,639,322 B2 | 5/2017 | Osawa et al. |
| 10,521,514 B2 | 12/2019 | Lee et al. |
| 2009/0225971 A1 | 9/2009 | Miller et al. |
| 2010/0312547 A1 | 12/2010 | Van Os et al. |
| 2011/0060591 A1 | 3/2011 | Chanvez et al. |
| 2011/0271207 A1 | 11/2011 | Jones et al. |
| 2012/0016678 A1 | 1/2012 | Gruber et al. |
| 2012/0035924 A1 | 2/2012 | Jitkoff et al. |
| 2012/0290950 A1 | 11/2012 | Rapaport |
| 2014/0164476 A1 | 6/2014 | Thomson |
| 2014/0195230 A1 | 7/2014 | Han et al. |
| 2014/0303960 A1 | 10/2014 | Orsini et al. |
| 2015/0019342 A1 | 1/2015 | Gupta |
| 2015/0310862 A1 | 10/2015 | Dauphin et al. |
| 2016/0104480 A1 | 4/2016 | Sharifi |
| 2016/0171982 A1* | 6/2016 | Kore ...................... G10L 13/00 704/235 |
| 2016/0182383 A1* | 6/2016 | Pedersen ............... H04L 47/781 709/226 |
| 2017/0180067 A1* | 6/2017 | Poornachandran .... H04H 20/71 |
| 2018/0077648 A1* | 3/2018 | Nguyen ................ H04W 4/021 |
| 2019/0095260 A1* | 3/2019 | Pradeep ................ G06F 3/0656 |
| 2019/0266871 A1* | 8/2019 | Verna ................ H04B 7/18504 |
| 2019/0378225 A1* | 12/2019 | Kundu ................ H04L 65/605 |
| 2020/0145493 A1* | 5/2020 | Wang ................ H04L 41/0823 |

FOREIGN PATENT DOCUMENTS

| | | |
|---|---|---|
| KR | 1020140007512 A | 1/2014 |
| KR | 1020140044015 A | 4/2014 |

\* cited by examiner

```
{
    "originIataAirportCode" : "JFK",
    "stageType" : "FLIGHT_DELAY",
    "destinationIataAirportCode" : "FLL",
    "carrier" : "B6",
    "dialect" : "RON",
    "flightNumber" : 375,
    "equipmentType" : "E90",
    "delayNumber" : "14",
    "departureDate" : "2019-06-06"
}
```

FIG. 3

SYSTEMS AND METHOD OF GENERATING CUSTOM MESSAGES BASED ON RULE-BASED DATABASE QUERIES IN A CLOUD PLATFORM

RELATED APPLICATIONS

This application claims priority from U.S. Provisional Patent Application No. 62/935,449, filed Nov. 14, 2019 and entitled "SYSTEMS AND METHOD OF GENERATING CUSTOM MESSAGES BASED ON RULE-BASED DATABASE QUERIES IN A CLOUD PLATFORM," the contents of which are hereby incorporated by reference.

TECHNICAL FIELD

The present disclosure relates to methods and systems for a computer-implemented electronic public announcement service. More particularly, the present disclosure relates to methods and systems for generating and routing messages to various edge devices connected to a cloud platform, by generating rule-based database queries and processing them in a cloud platform.

BACKGROUND

Public service announcements have a commonplace presence in various environments for purposes of crowd control and/or to disseminate information to the crowd. For example, such announcements are used in concerts, airports, train stations, libraries, school etc. These announcements all serve an important purpose of providing the same information to a large group of people at the same time.

Despite the advancement of technology and the use of Internet of Things (IoT), conventional public service announcements systems have remained largely localized and tethered to individuals at the location the announcement is being delivered. For example, at an airport or train terminal, each gate requires its own hardware equipment that usually includes a microphone type device (e.g., a wired telephone) connected to a terminal that is then connected to a local speaker system. Further, each gate would require its own individual "operator" who would need to speak into the microphone to make an announcement. Similarly, in a concert hall or a school an operator must always be present to operate the equipment and make an announcement. As the number of gates/terminals increase in each venue (e.g., airports), the number of terminals required for each gate and the number of operators required also increases. In addition, if a particular operator needs to make a high number of announcements or needs to make announcements at multiple locations on the same day, the chances of errors and inaccurate announcements increases due to the manual nature of processing such announcements.

In view of the foregoing, it is desirable to provide methods and systems for generating and routing messages to various edge devices connected to a cloud platform to render public service announcements by using rule-based database queries and processing them in a cloud platform. Such a system would improve the performance of the underlying technology by not requiring a terminal to be present at the destination of each public service announcement and would increase efficiency, reduce errors, and reduce operational costs by not requiring the presence of a operator at each location.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE INVENTION

One embodiment provides a computer implemented method for generating public service announcements by generating rule-based database queries and serving them to a cloud platform. For example, the embodiment is implemented using Internet of Things (IoT) technology that are often implemented in the "cloud" (i.e., via a network, such as the Internet), which provides a pathway for the data generated in the cloud platform in response to a request to travel to various destinations having edge devices. One way of communicating in an cloud-based IoT platform includes using an annotation service that enables various devices at remote locations to share and exchange message-based data with the IoT platform and enables the IoT platform to perform analytics and other device-related functions based on the collected data, such as device or building maintenance and management. These messages may be generated using specific schema which may be customized based on the needs of each operator (e.g., airline, rail service, concert venue etc.).

Systems and methods are disclosed for generating messages in a cloud platform. One method comprises storing a collection of audio files and destination information identifying location information corresponding to plurality of different geographic locations where a plurality of edge devices are located and grammar information including language-specific rules, receiving messages from one or more of a plurality of requesting devices, the messages including a first type of message and a second type of message, generating an action list, determining an available time slot at a first geographic location of a first edge device when the first edge device is available to render an announcement, retrieving, using the grammar information associated with the second type of destination information included in the action list, an audio file from the collection of audio files stored; and transmitting the audio file and the action list to the first edge device to render an announcement.

One embodiment discloses a system for generating and transmitting messages for rendering of announcements on a plurality of edge devices located at a plurality of geographic locations. The system includes storage within a cloud-platform storing a collection of audio files; a memory including a database storing information including: first type of destination information identifying one or more locations of venues where announcements are rendered; second type of destination information identifying location information corresponding to the plurality of different geographic locations where the plurality of edge devices are located, wherein the location information identifies locations within the one or more locations of the venues; and grammar information including language-specific rules; a network interface for receiving messages from one or more of a plurality of requesting devices, the messages including a first type of message and a second type of message; a rules parser implemented by a processor and located at a geographic location different from a first geographic location where a first edge device is located, the first edge device corresponding to one of the plurality of edge devices, wherein the rules parser: receives a message from a first requesting device via the network interface if the message corresponds to the first type of message, the first type of message including a plurality of fields of information; retrieves information stored in the database based on information included in the plurality of fields of the first type of message, the retrieved information including second type of destination information corresponding to the first edge device and grammar information associated with the second type of destination information of the first edge device; and generates an action list based on the retrieved information; a scheduler determining an available time slot at the first geographic location when the first edge device is available to render an announcement and updating the action list to indicate the determined available time slot; an IoT Hub using the grammar information associated with the second type of destination information included in the updated action list to retrieve a corresponding audio file from the collection of audio files stored in the storage and for transmitting the audio file and the updated action list to the first edge device, wherein the updated action list and audio file is used by the first edge device to render an announcement at the determined available time slot based on information included in the updated action list; and a real-time audio controller that receives a message from one or more of the plurality of requesting devices via the network interface if the message corresponds to the second type of message.

One embodiment provides a system for rendering public service announcements. The system may comprise one or more processors; and a non-transitory computer readable medium storing instructions that, when executed by the one or more processors, cause the one or more processors to perform the disclosed methods.

One embodiment provides a non-transitory computer readable medium for rendering public service announcements. The non-transitory computer readable medium may store instructions that, when executed by one or more processors, cause the one or more processors to perform the disclosed methods.

BRIEF DESCRIPTION OF THE DRAWINGS

Embodiments of the invention will now be described, by way of example only, with reference to the accompanying drawings in which:

FIG. 3 illustrates an exemplary structure of a request message call with corresponding data fields.

DETAILED DESCRIPTION

Figure 1:
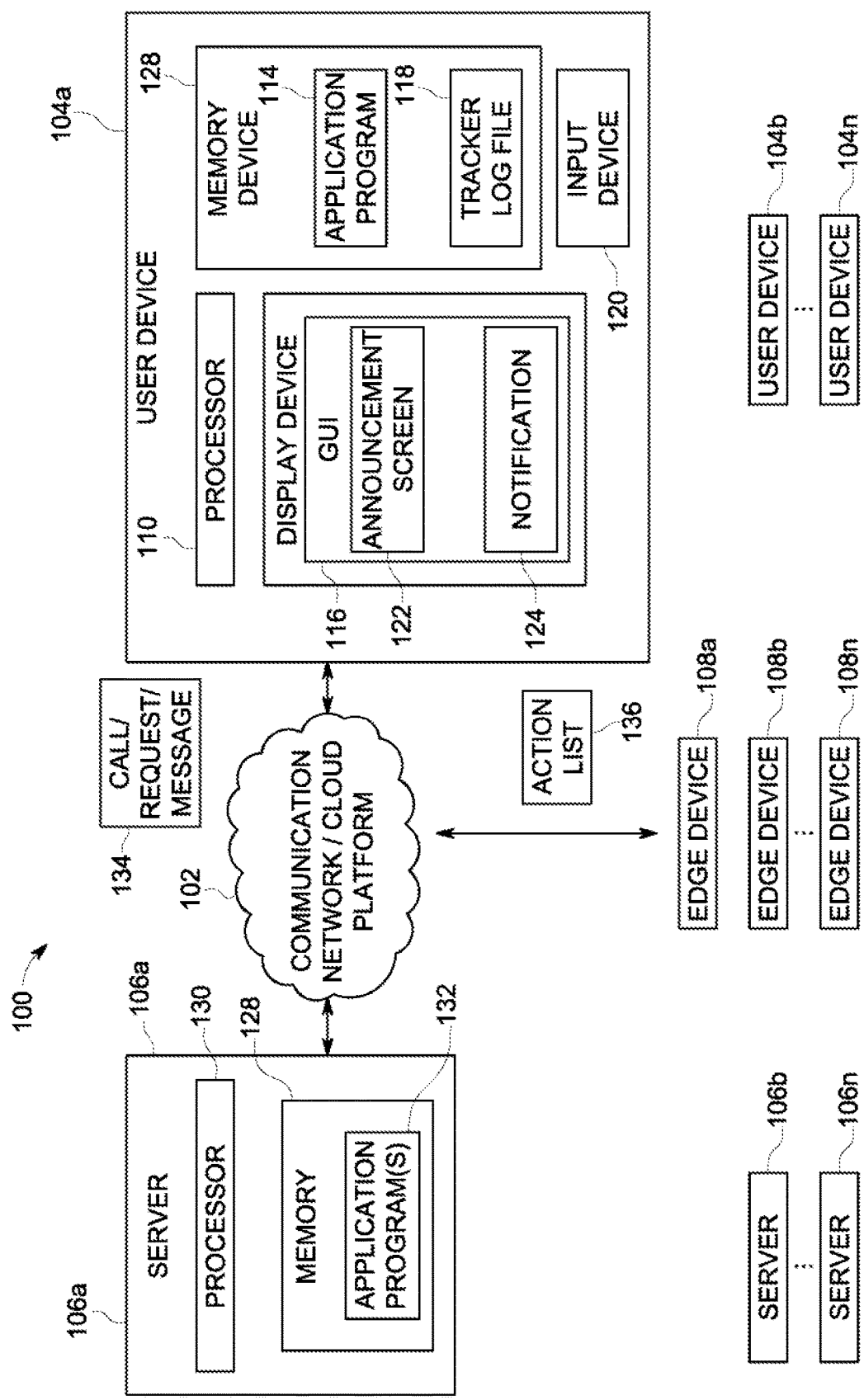
FIG. 1 is an exemplary embodiment of an IoT announcement service network.

The following embodiments describe systems and methods for implementing an IoT announcement service platform that generates custom messages based on rule-based database queries.

Typically, different types of edge devices connect to the cloud platform and transmit messages of varying schemas to the cloud platform. In an exemplary embodiment, the present disclosure is directed to systems and methods for enabling all, or at least a plurality of, messages that are accepted by the cloud platform to comply with a common schema so that the custom application may subscribe to messages coming from various sources and the system could be adapted to generate public service announcements for various applications. The custom applications may call a web application programming interface (API) of the cloud platform to request a stream and filters to be generated for message delivery that includes the content used for rendering of the public service announcement. The filters may be subjected to an authorization process prior to being added or associated with the corresponding streams, to ensure the custom application only subscribes to messages that the custom application is permitted to access. The filters may be simple filters and/or combination filters, and may include properties, values, and/or operators to identify messages to be delivered. Further, the custom application may specify a messaging end point in the stream request such that the desired messages will be delivered to a desired target destination.

It will be apparent, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "comprise," "include," "have" and any variations thereof are used synonymously to denote or describe non-exclusive inclusion. As such, a process, method, article, or apparatus that uses such terms does not include only those steps, structure or elements but may include other steps, structures or elements not expressly listed or inherent to such process, method, article, or apparatus.

Further, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item. As noted above, the term "exemplary" is used in the sense of "example," rather than "ideal."

Referring now to the appended drawings, FIG. 1 shows an exemplary embodiment of an IoT announcement service network 100. At the center of the annotation service network is a cloud platform/communication network 102. In general, FIG. 1 depicts user devices 104a through 104n, servers 106a through 106n in the cloud network, and edge devices 108a through 108n, all disposed in communication with cloud platform/communication network 102. Cloud platform/communication network 102 facilitates communication between a plurality of nodes 104a-n, 106a-n, and/or 108a-n. Communication network 102 may include one or more network types, such as a wide-area network (WAN), a local-area network (LAN), or the Internet. Communication network 102 may operate by wireline and/or wireless techniques and may use transmission control protocol/internet protocol ("TCP/IP"), Quick UDP Internet connections or any other appropriate protocol to facilitate communication between nodes 104a-n, 106a-n, and 108a-n of system 100. Network connections between the nodes of system 100 may be established via Ethernet, telephone line, cellular channels, or other transmission media.

Each node of system 100 may comprise a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components.

Consistent with an embodiment of the present invention, nodes 104a-n may be user devices 104a-n and nodes 106a-n may be servers 106a-n. User device 104a may be an appropriate device for sending, receiving, and presenting data. For example, user device 104a may include a personal computer, a point-of-sale terminal, a workstation, mainframe computer, notebook, or a handheld device such as a cellular phone, tablet, and/or a personal digital assistant. User devices 104a-n include, for example, a receiver, a transmitter, an application processor, a cellular modem, a Bluetooth modem, a WiFi modem, a GPS chipset for sharing location, an NFC chipset, an encoder/decoder, a touch screen, a camera for taking pictures and/or executing face recognition via infrared components, a fingerprint sensor for fingerprint recognition, an image signal processor (ISP), a display subsystem (DSP), a display device, a battery, a microphone, a speaker, a duplexer, an antenna connected to the duplexer so as to transmit or receive communication signals. The duplexer may also be connected to the receiver and transmitter for transferring received signals from the antenna to the receiver and for suppressing signal levels outside of the receiving band. The duplexer may also be connected to the transmitter for transferring signals from the transmitter to the antenna.

The receiver includes input amplifiers, filters, a down-converter, an amplifier, a quadrature demodulator (QDEM), and a base band demodulator (DEM). In the receiver, the signal from the duplexer is amplified by the input amplifiers, and its frequency is lowered down by the down-converter. The filters are band-pass filters such as Surface Acoustic Wave (SAW) filters. Then the signal is amplified by the amplifier and demodulated at the QDEM by a modulation signal. The demodulated signal is supplied to the DEM and converted into a voice signal code. The DEM outputs the voice signal code but also a signal indicating intensity of electric field of the received signals. The DEM has a function of adjusting its input level, which enables to detect the intensity of electric field of the received signals by watching how much adjustment was made to obtain the desired signal level.

The voice code signal is supplied to the encoder/decoder that includes a vocoder and a codec. The codec may be connected to an acoustic transducer. The acoustic transducer transduces sound or voice into electric signals or vice versa. The acoustic transducer includes a speaker and a microphone. The voice code signal is first supplied to a vocoder, where it is converted into a digital signal. An output of the vocoder is supplied to the codec, where it is converted into an audio signal. This audio signal is supplied to a speaker so that a user can hear the sound or voice transmitted from, for example, the cell-site station. The codec may also be connected to a microphone. The microphone picks up sound or voice and convert them into an audio input signal to, for example, enable a real-time public service announcement. This audio input signal is input into the codec, where it is converted into a digital audio signal. The digital audio signal is supplied to the vocoder and coded into an input voice code signal. The input voice code signal is supplied to the transmitter.

The transmitter includes a base band modulator (MOD), a quadrature modulator (QMOD), variable amplitude/gain amplifier, a filter, a power amplifier. The variable amplitude amplifier may include, for example, first-stage amplifier, filters, an up-converter, and a second-stage amplifier. The filters are band-pass filters such as SAW filters which are disposed for suppressing unnecessary waves for communication. In the transmitter, the input voice code signal is supplied to the MOD, where it is modulated into a signal suitable for wireless transmission. An output signal of the MOD is supplied to QMOD, where it is modulated by a modulation signal. An output signal of the QMOD, i.e., a modulated signal is supplied to the variable amplitude amplifier. In the variable amplitude amplifier, the modulated signal is supplied to the first-stage amplifier and amplified to a suitable level. An output of the first-stage amplifier, or the amplified modulated signal is supplied to the up-converter through the filter. A frequency of the amplified modulated signal is raised up at the up-converter to a suitable value or range for wireless communication. An output of the up-converter is supplied to the second-stage amplifier through the filter, where it is amplified to a suitable level at radio frequency. An output of the second-stage amplifier, namely the output of the variable amplitude amplifier is supplied to the power amplifier through the filter, where the power is amplified to a desired transmitting power. An output of the power amplifier means is supplied to the antenna through the duplexer.

The application processor may include a central processing unit (CPU), a memory and a digital-analog converter (D/A). The CPU may read data stored in the memory and output it via, for example, the D/A.

As an example and as shown in FIG. 1, user device 104a may include a memory device 108, a processor 110, a display device 112, and an input device 120. Memory device 108 may be used to store instructions, such as an application program 114 which may be executed by processor 110 to cause user device 104a to implement a plurality of operations. For example, application program 114 may be executed on processor 110 to display a graphical user interface (GUI) 116 on display device 112. Memory device 108 may also store a tracker log file 118.

Input device 120 may be a keyboard, a mouse, a trackerball, a stylus, a voice recognition device, and/or a touch screen implemented in GUI 116. Processor 110 may also function as a compiler and may execute source code of application program 114 to generate executable code and/or compiled code. For example, application program 114 may correspond to an announcement engine that is a program that is executed by processor 110 to allow a user to generate public service announcements. Input device 120 and GUI 116 may allow a user of user device 104a to interface with at least a portion of system 100. For example, GUI 116 may display an announcement screen 122 that may include options for selection by user to generate a public service announcement of different types (e.g., custom on-demand announcements and/or retrieving of predetermined announcements from the cloud-platform). GUI 116 may also display a notification 124 to inform a user of user device 104a about any errors and/or to receive additional information from the user. For example, a notification 124 may be generated if the cloud platform is unable to retrieve and/or generate an announcement due to a network error or lack of information, prompting the user to make the announcement manually and/or providing additional information. As explained above, user device 104a will include additional components, and user devices 104b-n may also include memory devices, processors, and application programs as described above with respect to user device 104a.

The IoT announcement service network 100 may also include edge devices 108a-n that are in communication with the remaining nodes via cloud platform/communication network 102. Each of the edge devices 108a-n may comprise a communication module (e.g., cellular/WiFi modem) that enables a wired or wireless connection to the cloud platform 102. The edge devices 108a-n may include sensors, actuators, and/or other devices that act as entry points to the network and exchange data with the cloud platform 102. Examples of edges devices 108a-n include routers, routing switches, integrated access devices (IADs), multiplexers, metropolitan area network (MAN), and wide area network (WAN) access devices. Edge devices 108a-n also provide connections into carrier and service provider networks. An edge device that connects a local area network to a high speed switch or backbone may be called an edge concentrator.

Edge devices 108a-n provide authenticated access (Point-to-Point Protocol over ATM (PPPoA) and Point-to-Point Protocol over Ethernet (PPPoE)) to faster, more efficient backbone and core network and may include Quality of Service (QoS) and multi-service functions to manage different types of traffic. Cloud platform/communication network 102 may implement routing protocols such as Open Shortest Path First (OSPF) or Multiprotocol Label Switching (MPLS) for reliability and scalability, allowing edge devices 108a-n to have redundant links.

Edge devices 108a-n may translate between one type of network protocol and another. For example, Ethernet or token ring types of local area networks (LANs) or xDSL equipment may use an Asynchronous Transfer Mode (ATM) backbone to other core networks. ATM networks send data in cells and use connection-oriented virtual circuits. An IP network is packet oriented; so if ATM is used as a core, packets may be encapsulated in cells and the destination address may be converted to a virtual circuit identifier. Some new types of optical fibre use a Passive optical network subscriber loop such as GPON, with the edge device connecting to Ethernet for backhaul (telecommunications).

Edge devices 108a-n may be a multiservice unit, meaning that it supports a wide variety of communication technologies, including Integrated Services Digital Network (ISDN), T1 circuits, frame relay, and ATM. Edge devices 108a-n may provide enhanced services, such as virtual private networking (VPN) support, Voice over IP, and QoS services. Edge devices 108a-n may send or publish messages to the cloud platform 102 that are further processed and analyzed by the cloud platform 102, which will be described in detail in the following sections. In another embodiment, edge devices 108a-n may have the processing capacity to process and analyze data locally, instead of or in addition to in the cloud platform 102. Edge devices 108a-n may also be disposed in communication with a servers 106a-n such that they receive cloud-to-device messages that include information necessary to render a public service announcement.

User devices 104a-n may communicate with servers 106a-n via communication network/cloud platform 102. The communication may include sending data, such as requests to provide a public service announcement at a particular edge device and/or receiving instructions for generation of a customized, manual, or on-demand announcement when there is no connectivity or there is an error in generating a public service announcement based on information saved in servers 106a-n. As an example, server 106a may include a memory device 128 and a processor 130. Memory device 128 may include one or more application programs 132 that may be executed on processor 130 to perform one or more functions for purposes of generating public service announcements.

Although the exemplary embodiment of system 100 is illustrated as having particular components arranged in a particular manner, one skilled in the art will appreciate that system 100 may include additional or fewer components that may be arranged differently. For example, as will be explained in further detail below with respect to FIG. 2, server 106a may implement various components locally and/or these components may be implemented using various computing nodes distributed across servers 106*a-n* that are in communication with each other via communication network/cloud platform 102. These components may be implemented via a combination of software and/or hardware using, for example, memory device 128, processor 130, and application program(s) 132.

Memory devices 108 and 128 may include all forms computer-readable storage mediums such as of non-volatile or volatile memory, including, by way of example, non-transitory semiconductor memory devices, such as EPROM, RAM, ROM, DRAM, EEPROM, and flash memory devices; magnetic disks such as internal hard disks and removable disks; magneto-optical disks; and CD-ROM disks.

In the exemplary embodiment, user devices 104*a-n* may be located at, for example, the destination where the public announcement needs to be made and/or at any location from where a call can be issued to generate a public announcement. For example, user device 104*a* may be located at gate 5 of JFK airport and/or at a central control room of the airport. Further, edge devices 108*a-n* may be located at the exact location where the public announcement needs to be rendered as they receive an action list from cloud platform 102 that dictates when edge device must render a public announcement. For example, edge device 108*a* may be located at gate 5 of JFK airport and/or a particular concert hall or train station. Further, servers 106*a-n* may be distributed across various geographic locations as facilitated by cloud platform/communication network 102. For example, servers 106*a* that provides announcement for JFK airport may be located in a server farm in Virginia, California, Iowa, or Iceland.

Figure 2:
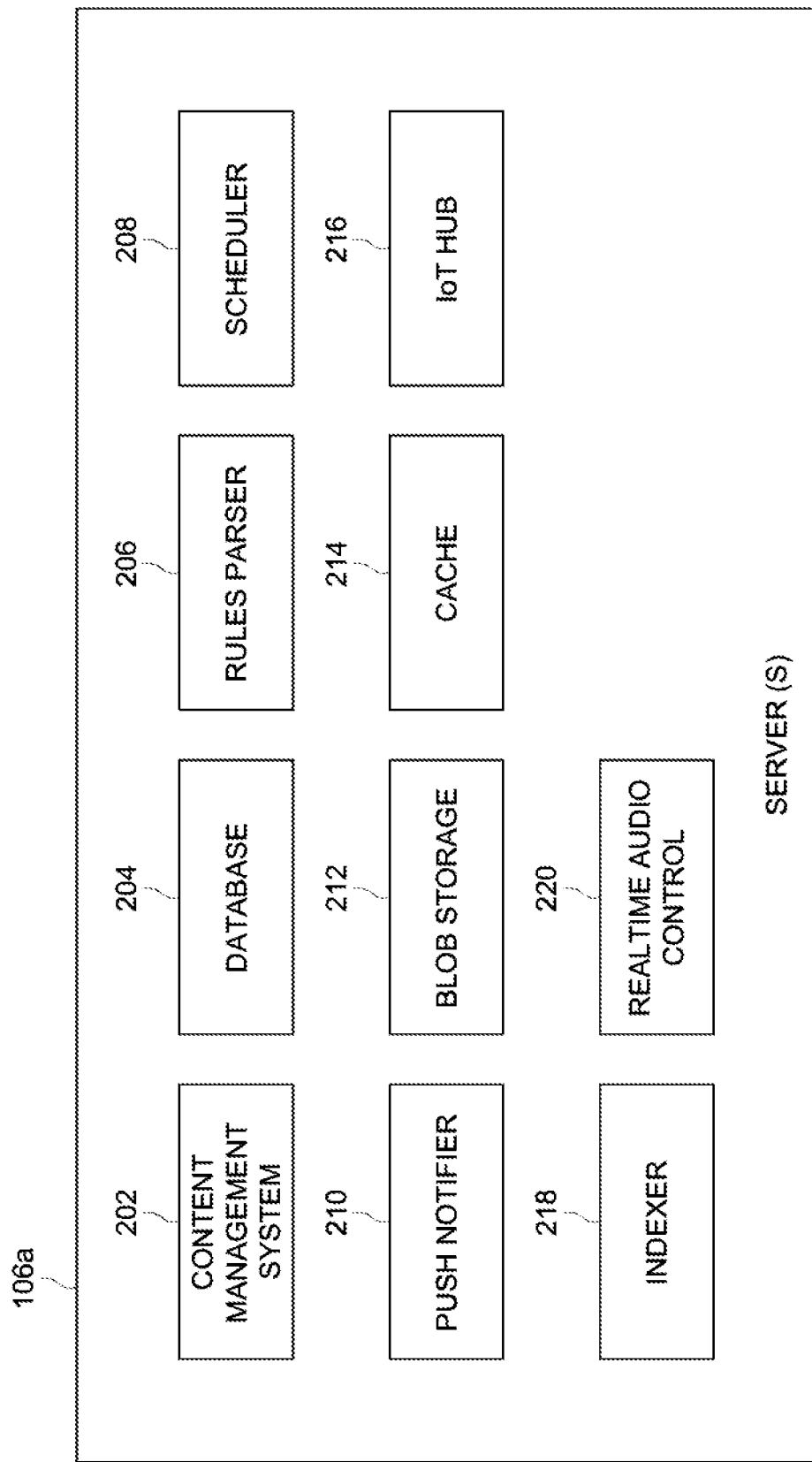
FIG. 2 illustrates a detailed diagram of components in an exemplary server/cloud platform of the IoT announcement service network, consistent with the present invention.

FIG. 2 illustrates exemplary components that may be included in server 106*a*, distributed across servers 106*a-n*, and/or may be distributed across various nodes while in communication with each other over cloud platform/communication network 102. Any reference to server 106*a* is for exemplary purposes only as one of ordinary skill in the art would understand that in cloud computing components are implemented in a distributed fashion.

As shown in FIG. 2, server 106*a* may include a content management system 202, a database 204, rules parser 206, scheduler 208, push notifier 210, blob storage 212, cache 214, IoT Hub 216, indexer 218, and realtime audio controller 220 each of which may be implemented using one or more of processor 130 executing application program 132 that is stored in memory device 128.

Content management system 202 interacts with database 204, indexer 218, and blob storage 212 to manage the content and data stored therein. For example, the content management system 202 may receive an action list from rules parser that may indicate that data stored in blob storage 212 needs to be updated. Content management system may then execute this action list to add/remove information from blob storage 212. Similarly, content management system 202 may perform error correction, testing, updating, recovering, accessing, read, write, and/or additional information processing tasks associated with information stored in database 204, indexer 218, and blob storage 212. For example, content management system 202 may instruct indexer 218 to update the index of information stored therein for the information stored in database 204.

Database 204 stores a variety of information needed to generate a public service announcements. For example, database 204 stores metadata needed to form comments, reference data, country information, destination information (e.g., JFK airport, Union Station DC, Capital One Arena DC), exact location of the destination where the announcement must be rendered (e.g., gate 5 at JFK airport or entrance A in Capital One Arena), audio record/audio bank information that is used to access recorded audio commands in blob storage 212, and/or grammar information that is, for example, tied to specific destinations. Grammar information may indicate, for example, the way sentences are crafted in certain languages.

Database 204 may store this information as tables of data, where the tables may represent relations between the stored data. These relations may be based on attributes of the stored data. The tables may consist of rows and columns, where a row or column may be referred to as a tuple. Tables in databases may implement relations by using rows of a table to indicate tuples and using columns to represent a tuple's attribute values. During operation and generation of public service announcements, data may need to be extracted from the database systems such as content management systems (CMS) such that a query including a logical condition may be processed to extract sets of tuples that meet the logical condition. Tuples may contain values from more than one table, and a table representing one relation (relation A) can include a column for the same attribute as another table representing another relation (relation B). To extract the tuples, the table representing relation A may be joined with the table representing relation B. The tables may be joined by logically matching rows using the values of the attributes stored in the columns of the tables. Prior to joining the tables, join conditions for each join may need to be evaluated and each join condition J may include two pair lists, one for each of the relation represented by the join. Each pair list may represent a plurality of tuples reflecting attributes associated with the stored data.

For example, if a join condition J may reference two relations A and B. The evaluation of J may then include determining all pairs (a, b), where "a" may represent values in a row of the table representing relation A and "b" may represent values in a row of the table representing relation B. The values may be selected such that they satisfy the condition J by joining A and B. If J is a condition represented by $A \cdot x = B \cdot y$, where "x" may be an attribute of relation A and "y" may be an attribute of relation B, then the pair (a, b) of rows should satisfy the condition $a \cdot x = b \cdot y$.

Further, two pair lists PL (A, J) and PL (B, J) may be generated during evaluation of join conditions. PL (A, J) may consist of pairs (a0, x0), where the first component "a0" may be an identifier for a row "a" of the table representing the relation A and "x0" may be the value $a \cdot x$. Similarly, PL (B, J) may consist of pairs (b0, y0), where the first component "b0" may be an identifier for a row "b" of the table representing the relation B and "y0" may be the value $b \cdot y$. When a total join consists of n join condition, there may be 2*n pair lists and these pair lists need to be reduced to decrease the size of the pair lists, by assigning, or allocating one pair list (or parts thereof) from the host where it is located to the host of another pair list. Once the reduction is performed, the remaining join evaluations may include allocating or assigning all pair lists a common host. For example, evaluating join J to satisfy condition $A \cdot x = B \cdot y$ may include matching two reduced pair lists PL (A, J) and PL (B, J) by forming a pair (a, x) in PL (A, J) and a pair (b, y) in PL (B, J), such that x is equal to y and a new reduced pair (a, b) may be generated. Techniques such as hash join, a sort merge join, a join via semijoin, incidence coloring joining, and nested loop join may be implemented to perform the data extraction.

Indexer 218 may be a data structure associated with database 204 and may improve the speed of data retrieval operations from database 204. Indexer 218 may be used to quickly locate data from database 204 without having to search every row in database 204 table every time a public announcement needs to be generated. Indexer 218 may be created using one or more columns of database 214 providing the basis for both rapid random lookups and efficient access of ordered records. For example, indexer 218 may include tuples of information related to the gates of a venue/airport/train station, the associated grammar with those gates and additional logs related to the database.

Indexer 218 may also include the a low-level disk block address or direct link to the complete row of data from database 204 where the tuples were was copied from. Indexer 218 may be one or more of a bitmap index, a dense index, sparse index, reverse index, primary index, and/or secondary index.

Rules parser 206 receives a REST message from, for example, user device 104a when a public announcement needs to be generated. In response to such a REST message, rules parser 206 may set a delay and then access data from one or more of indexer 218 and database 204 to retrieve grammar information for purposes of constructing a proper action list based on the information in the REST message. For example, if the REST message is triggered by a "flight event" (incoming flight), the grammar will provide an action list to generate an announcement that includes all the information associated with an incoming flight. In the alternative, if the REST message is triggered by an emergency to evacuate a stadium or terminal, the grammar information will cause generation of a different type of action list. The action list may dictate, for example, to take certain actions based on the type of the event, e.g., send notification to all the passengers on the plain via text message email in addition to providing the announcement to a particular edge device.

Rules parser 206 sets a delay because it does not want two public service announcements to overlap and/or it may want to create a distinction between two consecutive announcements. For example, the delay may be set such that the action list dictates that a chime or music or a predetermined message (may I have your attention please) may be played in the delay period before rendering of the actual public service announcement.

Once rules parser 206 creates an action list, scheduler 208 may use information from the REST call or the database 204 and determines the destination at which the public service announcement needs to be rendered. For example, the REST call may include gate information of a particular venue and then the scheduler will use that information to determine that the announcement needs to be made in the speakers at that gate and the adjoining gates and/or the entire terminal to make sure that all the targeted audience receives the announcement. In case of an emergency, the scheduler may determine that the announcement needs to be rendered to cover a larger geographic region versus just information about a flight arrival, which would only require the announcement to be made in a specific localized area. Thus, scheduler 208 may adjust the geographic region where the public service announcement needs to be rendered based on the type of the event in the REST call.

Once scheduler 208 determines the exact location where the public announcement needs to be made (e.g., gates 4, 5, and 6 at JFK airport or concert hall or train station), the scheduler determines the next available time at the destination when the public service announcement can be made. For example, an announcement may already be playing at certain gates and scheduler 208 does not want to interrupt that announcement. Thus, scheduler 208 may access cache 214 that keeps track of all actions that have been send to particular destinations (e.g., music playing, announcement corresponding to REST call 1 playing, announcement corresponding to RPC call playing etc.). Cache 214 may include the information that informs scheduler 208 on when would be the next available time slot at the particular gate for the instant announcement. In the alternative, scheduler 208 may communicate directly with edge devices 108a-n at the destination location and determine what the next available time slot is.

Once scheduler 208 determines the available information for the time slot, it updates the action list generated by the rules parser with the timing information, updates cache 214 to indicate the time slot it has chosen for a particular destination (e.g., gate 4, 5, and 6 of JFK) and then sends this updated action list to IoT Hub 216.

IoT Hub 216 a managed service, hosted with the support of cloud platform 102 and may act as a central message hub for bi-directional communication between, for example, servers 106a-n, user devices 104a-n, and/or edge devices 108a-n. Thus, any message between these nodes may be communicated via IoT Hub 216. As an example, IoT Hub may be implemented via Microsoft Azure or Amazon cloud or iCloud. IoT Hub 216 may be used to perform reliable and secure communications between millions of nodes in cloud platform 102.

IoT Hub 216 may support multiple messaging patterns such as device-to-cloud telemetry, file upload from devices, and request-reply methods to control devices in system 100 and/or to facilitate communication between the nodes in system 100. IoT Hub 216 may also include a monitoring module to ensure that each node in system 100 is operational and/or to perform diagnostics and error correction. For example, IoT Hub 216 may access the tracker log file 118 in each user device 104a-104n to determine the errors that have been logged and may send messages and/or scripts to user devices 104a-n and/or edge devices 108a-n to run diagnostics, update software, and/or perform debugging and correctional operations.

In order to ensure secure communications, IoT Hub 216 may implement SAS token-based authentication, individual X.509 certificate authentication for secure, standards-based authentication and/or X.509 CA authentication for simple, standards-based enrollment.

The IoT Hub 216 processes the action list received from scheduler and sends it to the appropriate edge device 108a-n corresponding to the location (e.g., gate) where the public announcement must be rendered. This action list may be received at, for example, edge device 108a that may be residing at a local airport terminal, gate, concert hall. Edge device 108a will read the action list and determine the type of announcement based on the information the action list. Further, edge device 108a may use network time protocol (NTP) to synchronize the schedule identified by scheduler 208 with the local schedule on edge device 108a. Based on its geographical location, edge device 108a may already have a collection of prerecorded audio messages with the corresponding grammar and voice for that location (e.g., southern accent in English language for a gate in an airport in Dallas, Tex.) that it stores locally after retrieving it from BLOB storage 212 and/or it may receive these audio messages from the IoT Hub 216 along with the action list and/or edge device 108a may retrieve the specific audio message from BLOB storage 212 after receiving the action list and determining that a particular type of voice announcement is needed (e.g., flight delay, flight arrival, concert start, evacuation announcement) based on the type of announcement identified in the action list. Specifically, BLOB storage 212 may include a collection of audio files that may correspond to words or strings in different languages/accents/dialects etc. BLOB storage 212 may be implemented using a content management system specifically programmed to be compatible with the disclosed system. For example, BLOB storage 212 may store prerecorded audio clips that correspond to specific events as shown in the examples below:

| Event | Prerecorded Audio Clip |
| --- | --- |
| Flight delay | Nancy's voice: "Your attention please, flight 125 has been delayed and is now departing at 2:00 pm" |
| | Ron's voice: "Your attention please, flight 125 has been delayed and is now departing at 2:00 pm" |
| | Dan's voice: "Your attention please, flight 125 has been delayed and is now departing at 2:00 pm" |
| Flight arrival | Nancy's voice: "Your attention please, flight 125 has now arrived" |
| | Ron's voice: "Your attention please, flight 125 has now arrived" |
| | Dan's voice: "Your attention please, flight 125 has now arrived" |
| Evacuation message | Nancy's voice: "This is an emergency, please exit the building immediately using the nearest exit" |
| | Ron's voice: "This is an emergency, please exit the building immediately using the nearest exit" |
| | Dan's voice: "This is an emergency, please exit the building immediately using the nearest exit" |
| Active shooter | Nancy's voice: "This is an emergency, there is an active shooter, please take cover until you see law enforcement officials" |
| | Ron's voice: "This is an emergency, there is an active shooter, please take cover until you see law enforcement officials" |
| | Dan's voice: "This is an emergency, there is an active shooter, please take cover until you see law enforcement officials" |

The same announcements may be recorded in different voices such that the action list will indicate which voice to select based on the location of the destination where the announcement will need to be made.

As an additional example, the action list may include a simple message generated automatically from user device 104a and/or by a user of user device 104a requiring an update of a particular edge device (e.g., 108a). For example, user device 104a may issue a REST call that the rules parser 206 and scheduler 208 may execute by retrieving audio content from BLOB storage 212 and providing it to a particular edge device 108a for purposes of edge device updating its local storage. For example, if additional audio clips related to the event of flight arrival in the voice of John need to be added to edge device 108a, the action list may cause rules parser 206 and/or scheduler 208 to work in conjunction with content management system 202 to retrieve audio clips of John's voice from BLOB storage 212 and provide them to edge device 108a via IoT Hub 216. Edge device 108a may then update its local storage by storing John's voice. While executing the update operation, edge device 108a may send a message to other nodes in system 100 to inform them that it is offline and/or may display a message (e.g., on a touch screen or via a blinking of an LED) to provide an indication that it cannot be used to provide public service announcements while it is updating itself. Thus, such updating operations may be executed automatically when no events are expected (e.g., airport or train station is closed) and/or at a time when nearby or backup edge devices in the same geographic region are available to render announcements.

Returning now to the execution of the action list by edge device 108a, once edge device 108a has the appropriate audio clip and it determines that the time identified by scheduler 208 has been reached, it then renders the announcement by accessing the local audio system (e.g., speakers). If during this process, there are any errors and/or interruption in connectivity, edge device 108a may send a message back to the device that initiated the request (e.g., sent the REST call), which in this case is user device 104a, to report the error. User device 104a may then log the error in tracker log file 118 and may try to initiate the process again by sending a duplicative REST message and/or may display a message on announcement screen so that a user may know that the announcement was not rendered successfully and the user must provide the announcement manually via input device 120. Similarly, if the announcement was rendered successfully, edge device 108a may still send a message to the requesting device 104a that may track the success in tracker log file 118 and may display a message on announcement screen 122 or display a notification 124 showing text corresponding to the announcement and/or a descriptive message indicating that the announcement was made successfully. For example, announcement screen 122 may display the words of the announcement "Your attention please, flight 125 has been delayed and is now departing at 2:00 pm" and notification 124 may provide a message "SUCCESS" or a green icon indicating that the system functioned correctly.

In addition to sending the action list to edge device 108a, IoT Hub 216 may also send the announcement or a message relating to the announcement to individual/pre-registered passengers who will benefit from the announcement. For example, system 100 may be setup such that IoT Hub 216 knows that when a passenger announcement about a flight delay is rendered, a corresponding message must also be sent via text message or email to all the passengers on the particular flight who have opted in to receive such notifications.

As will be explained in further detail below, realtime audio controller 220 is used instead of the scheduler 208 when a user of user device 104a is requesting a manual override of the system by making an on-demand announcement by sending an RPC (remote procedure call) instead of a REST call with the audio clip inputted by the user using, for example, input device 120 at that time. In this case, the realtime audio controller 220 facilitates the rendering of the announcement by negotiating channels and a subscription id to provide the audio clip to the relevant edge device with appropriate compression techniques that will be describer further below.

Referring now to both FIG. 1 and FIG. 2, the entire sequence of an exemplary public service announcement will be provided. At the beginning, a user of user device 104a may want a public service announcement to play at edge device 108a in response to a particular event. Or user device 108a may detect an event (e.g., flight arrival, concert ending, train departure) which may require the rendering of a public announcement on edge device 108a. In either instance, user device 108a may issue/publish/transmit a call/request/message 134 to cloud platform/communication network 102. If the desire is to render an announcement based on prerecorded audio, call/request/message 134 may be a REST call. The REST call 300 may be of the structure shown in FIG. 3 (also copied below):

```
{
"originIataAirportCode" : "JFK",
"stageType" : "FLIGHT_DELAY",
"destinationIataAirportCode" : "FLL",
"carrier" : "B6",
"dialect" " "RON",
"flightNumber" : 375,
"equipmentType" : "E90"
"delayNumber" : "14",
"departureDate" : "2019-06-06"
}
```

A GRPC call may be used instead of and/or in addition to a REST call. The REST call may include information about the flight (e.g., origin, destination, carrier, flight number), the type of event triggering the announcement (e.g., flight delay), the dialect/voice (e.g., RON), and/or date. The type of fields shown in REST call 300 are just exemplary in nature and one of ordinary skill in the art would understand that additional or fewer fields may be included. For example, the REST call may only include an unique identifier or code that may be used to generate the additional information using a search and retrieve function with database 204.

Cloud platform/communication network 102 may provide the REST call 300 to additional nodes in system 100 such as server 106a. For example, REST call 300 may be provided to rules parser 206 that sets a delay period to accompany the eventual announcement. The delay period may be, for example, to play music, chime, and/or silence before or after the public service announcement.

In addition rules parser 206 uses the information from the REST call (e.g., dialect, airport information, event) to retrieve additional information from, for example, database 204. Rules parser 206 may use the indexer 218 to retrieve information from database more efficiently. The information may be related to the correct grammar required for the corresponding dialect. In addition, rules parser 206 may use the flight information to determine the corresponding gates where the public announcement must be rendered by accessing the appropriate tuples from database 204. For example, database 204 may store tuples of information that are associated with each other and indexed by flight number such that database 204 knows that flight 375 at origin airport departs from gate 4 and arrives at destination airport at gate 7. Using the retrieved grammar, gate information, and/or additional information in the REST call rules parser 206 generates an action list and provides it to scheduler 208. The action list may include, for example, information about playing a chime during delay period followed by an announcement of flight delay in Ron's voice at gate 4 of origin airport and gate 7 of destination airport while also notifying those passengers via text and/or email who have opted in to receive additional notifications.

This action list is then provided to scheduler 208 that fetches the next available time the announcement can be made on a particular edge device at the corresponding location (e.g., gate). For example, scheduler 208 may determine that edge device 108a is currently updating and is offline and/or is currently playing an announcement about another flight which is anticipated to last twenty seconds. Scheduler 208 may do this by accessing information about the location via cache 214 and/or may directly communicate with edge device 108a to check the status. Once scheduler 208 determines an available time slot, it updates the action list. For example, the action list may now include information about playing at 2:01 pm a chime during delay period followed by an announcement of flight delay in Ron's voice at gate 4 of origin airport and gate 7 of destination airport while also notifying those passengers via text and/or email who have opted in to receive additional notifications.

In addition to updating the action list, scheduler updates cache 214 so it knows now that a message will be played at gates 4 and 7 from 2:01 pm to 2:02 pm and sends this updated action list to IoT Hub 216. IoT Hub 216 sends action list 136 to the appropriate edge devices (e.g., 108a at origin and 108b at destination). Edge devices may already have previously downloaded audio clips associated with the particular dialect and event (e.g., Ron's announcement of flight delay) or IoT Hub 216 may access BLOB storage 212 to send the relevant audio clip with the action list and/or edge devices may attempt to retrieve the relevant audio clips from BLOB storage 212 upon receipt of the action list. Once, edge devices 108a and 108b receive the action list, they use network time protocol to synchronize their schedule with the schedule identified by scheduler 208 in action list 136 and executes the action list when the requested time arrives (e.g., 2:01 pm). For example, edge devices 108a and 108b may retrieve the audio clip of Ron related to flight delay of flight number 375 and route the relevant audio clip with a preceding predetermined chime/music/silence to the appropriate sound system at gates 4 and 7.

In addition to sending action list 136 to edge devices 108a and 108b, IoT Hub 216 may also facilitate the sending of corresponding text or email messages to customers who have opted in to receive such notifications. For example, IoT Hub 216 may send an instruction to subscription service with the corresponding flight information and event (e.g., delay), which will generate an automated text/email message that will be pushed automatically to all the devices of customers.

Further, after or during successful rendering of the announcements by edge device 108a and 108b, edge devices may send a confirmation message back to user device 104a and the announcement may be displayed on announcement screen 122 and success notification 124 may be generated. In addition, tracker log file 118 may be updated to record the successful rendering of the announcement.

In the event that the announcements are not rendered successfully and depending on the type of error (e.g., error in scheduler, rules parser, database access or edge device), either IoT Hub 216 or one or more of edge devices 108a and 108b may send a message to user device that the announcement was not rendered. For example, if there was an error in one or more of rules parser 206, database 204, scheduler 208 or IoT Hub 216, the IoT Hub 216 will send an error message back to the requesting device (e.g., user device 104a). And if there was an error in one or more of the edge devices 108a and 108b that particular will send an error message back to the requesting device. GUI 116 may then display words corresponding to the announcement on announcement screen 122 and display a notification 124 indicating that this announcement was not successfully made. In this way, the user device 104a may send an additional request to try and make the announcement again and/or the system may notify the user that "announcement not rendered; please implement announcement manually." Further, the tracker log file 118 may be updated to record the error and the origin of the error (e.g., scheduler 208 or edge device 108b).

Returning now to the beginning of the process, system 100 also provides an option to a user of user device 104a to make an announcement in real-time without using a pre-recorded audio clip. For example, in the event that there is an error and/or in the event that there is an exception circumstance (e.g., passenger Patel forgot their bag on gate 5) where a pre-recorded audio clip is not available at edge device 108a or in BLOB storage 212, a user may want to issue an on-demand announcement. In this instance, system 100 implements a different process.

For example, a user of user device 104a may use input device 120 (e.g., a microphone) to record an announcement and indicate the destination at which this announcement must be rendered. The recorded audio may be recorded as a byte array and the byte array may be compressed by, for example, processor 110 executing a compression program. As an example, the byte array may be compressed to a UTF-8, UTF-16, UTF-32, and/or any alternative and suitable compression format. The byte array may also be compressed to be in a gzip file format.

For this operation application program 114 may be executed on processor 110 to display additional screens and menu options on GUI 116 to provide the user with options to search for and select a location (e.g., gate 5 at JFK airport or gate 5 in Union Station DC) and record a message. For example, notification 124 may state "record your message now" and announcement screen 122 may render the text corresponding to the audio message to ensure accuracy. Once the user selects the location and records the audio clip, user device 104a may issue/publish/transmit a call/request/ message 134 to cloud platform/communication network 102. In this instance, however the call/request/message 134 may be gRPC subscription messages.

The gRPC subscription messages are sent to realtime audio controller 220 via communication network/cloud platform 102. Upon receipt of the subscription messages, realtime audio controller 220 may generate an action list of playing the announcement and send this action list to IoT Hub 216. As part of executing the action list, IoT Hub 216 negotiates a channel with realtime audio controller 220 and/or the destination edge device 108a by, for example, generating a channel identifier or a subscription identifier. For example, the IoT Hub 216 may generate a channel identifier and/or the IoT Hub 216 may receive the channel identifier from the destination edge device 108a and/or realtime audio controller 220. Once the channel identifier has been issued, using gRPC protocol the realtime audio controller 220 responds to the message 134 and provides the channel identifier back to the requesting device (e.g., user device 104a) and informs the requesting device that you can now send the recorded announcement/audio message to me using the channel identifier. Simultaneously (e.g., within the same time period), IoT Hub 216 messages the realtime audio controller 220 that it has now subscribed to a channel corresponding to the channel identifier and has established this channel with the destination device (e.g., edge device 108a). In this message, IoT Hub 216 also informs realtime audio controller 220 that since it has subscribed to the relevant channel the realtime audio controller 220 should send the data packets including the audio file corresponding to the announcement.

When user device 104a receives the channel identifier from realtime audio controller 220, the user device 104a applies a second level of compression on the compressed byte array. For example, processor 110 may execute application program 114 to compress the gzip file by including it in a gRPC message in protobuf format (e.g., protocol buffer). Other types of compression may also be applied. This gRPC message is then sent to edge device 108a on the appropriate channel for rendering. For example, the gRPC message with the dual-compressed byte array may be send to realtime audio controller 220 and then from realtime audio controller it may go to IoT Hub 216 that may then send it to edge device 108a on the appropriate channel. In the alternative, user device 108a may send it directly to IoT Hub 216 and/or edge device 108a.

Once edge device 108a receives the dual-compressed byte array, a processor or decompressor on edge device 108a may first apply a first level of decompression (e.g., it may decompress the protobuf format) to recover the compressed byte array. Then the processor or decompressor may apply a second level of decompression (e.g., ungzip the gziped byte array) to recover the audio file. Once the two levels of decompression are applied, the edge device will render the announcement by routing the audio file to the appropriate speaker system. Edge device 108a may include a single processor with a single application program that applies both levels of decompression and/or may include dedicated decompression circuits or algorithms that are specific to the type of compression/decompression formats applied.

As was explained above, once the announcement is rendered and/or if there is an error, edge device 108a may report back to the requesting device (e.g., user device 104a) and tracker log file 118, announcement screen 122, and notification 124 may be updated based on successful or unsuccessful rendering.

Returning now to the instant when user device 104a sends the dual-compressed byte array, user device 104a may follow this transmission with a message indicating that now that the audio file has been sent there is no need to subscribe to the channel. Thus, after sending the audio file, user device 104a sends a message to realtime audio controller 220 to initiate a sequence of channel termination. Based on this message, realtime audio controller 220 generates an action list with the task of "channel termination" and sends this to IoT Hub 216 which then sends it to edge device 108a. Edge device 108a executes the action list by terminating the channel and sends a message to user device 104a that it no longer needs to continue subscribing to the channel. After circulation of this message and action list, each of user device 104a, realtime audio controller 220, IoT Hub 216, and edge device stop subscribing to the channel and the tracker log file 118, announcement screen 122, and notification 124 may be updated accordingly. This way, IoT announcement system 100 creates a channel on an ad-hoc basis using, for example, gRPC protocol and dual compression such that channels can be created for short periods of time and terminated efficiently and effectively without tying up the bandwidth of the communication network/cloud platform 102 by using dedicated channels. In addition, using dual-compression ensures that audio files are transmitted without overloading the system and requiring extensive networking bandwidth. Further, the dual-compression ensures that audio files are transmitted without any loss, thus implementing the scheme of lossless audio transmission for passenger announcements without the need for dedicated equipment at each venue where an announcement needs to be made.

Returning now to the beginning of the process, system 100 also provides an additional option to a user of user device 104*a* to make an announcement with a text of string as opposed to an audio clip. For example, in the event that system 100 wants to render an announcement by displaying it on a screen associated with edge devices 108*a*-*n* in addition to or instead of rendering them on speakers, user device 104*a* may send a string of text via call 134 to scheduler 208. In this instant, there will be no need to retrieve grammar information from database 204 because the call will include an indication of the language and will include the actual text string that needs to be displayed. Scheduler 204 will create an action list with the destination information and identify an available time slot as discussed above. At this stage scheduler 208 may have two options. One option may be to send the message to text to speech platform that converts the message into a predetermined format required for displaying the message and this string will be stored in BLOB storage 212 and the storage location may be then provided to scheduler 208 that will update the action list with the storage location and send the action list to IoT Hub 216, which will then send it to the appropriate edge device (e.g., edge device 108*a*). The stored string may be a UTF-16 byte array in string format that represent bytes for playing audio. Edge device 108*a* may accordingly execute the action list by using the storage location to retrieve the text string from BLOB storage 212 and may then render the message by routing it to the appropriate display screen(s) at the time identified in the action list.

The second option would be that edge device 108*a* may be provided an action list by IoT Hub 216 that indicates that the text string is available at the text to speech platform. In this option, edge device 108*a* may execute the action list by directly interfacing with the text to speech platform (i.e., skip storing of the text string in BLOB storage 212) and receive or retrieve the text string and route it for rendering as explained above.

Once again, even for public announcements that are displayed, edge device 108*a* may report back to user device 104*a* on whether the announcement was displayed successfully or unsuccessfully and tracker log file 118, announcement screen 122 and notification 124 may be updated accordingly.

In each instance, reporting back to the requesting device ensures accurate rendering of announcement and provides an option to monitor the performance of the system and/or provides an alternative/failsafe mechanism whereby the announcement can be made locally using alternative mechanism (e.g., manually) if there are any errors in IoT announcement system 100.

Each message/call 134 received by the cloud platform/ communication network 102 may be configured to conform to predetermined types (e.g., Event and Alarm). The message/call 134 may be configured to conform to a common schema, which provides a common information model that covers all devices connected to the communication network/ cloud platform 102. Having a common schema may allow the IoT announcement system 100 to easily de-serialize messages coming from all types of sources (i.e., devices, applications). For instance, each message may conform to the following schema:

| Property | Property Type | Property Description |
|---|---|---|
| Id | string | Id of mesage |
| CreatedTime | DateTimeOffset | Datetime offset when the message is created |
| CreatorId | string | Id of Creator, which is the agent responsible for creating the message |
| CreatorType | string | Type of Creator |
| GeneratorId | string | Id of the Generator, which is the agent responsible for generating the message to be transferred between client and server |
| GeneratorType | string | Type of Generator |
| TargetId | string | Id of the target of the message |
| TargetType | string | Type of target |
| Targetcontext | string | Detail context of the target |
| Body | string | The detail or contents of the message |
| BodyProperties | string | List of key-value pairs for other properties of the message |
| EventType | string | Type of event or alarm |

Figure 4:
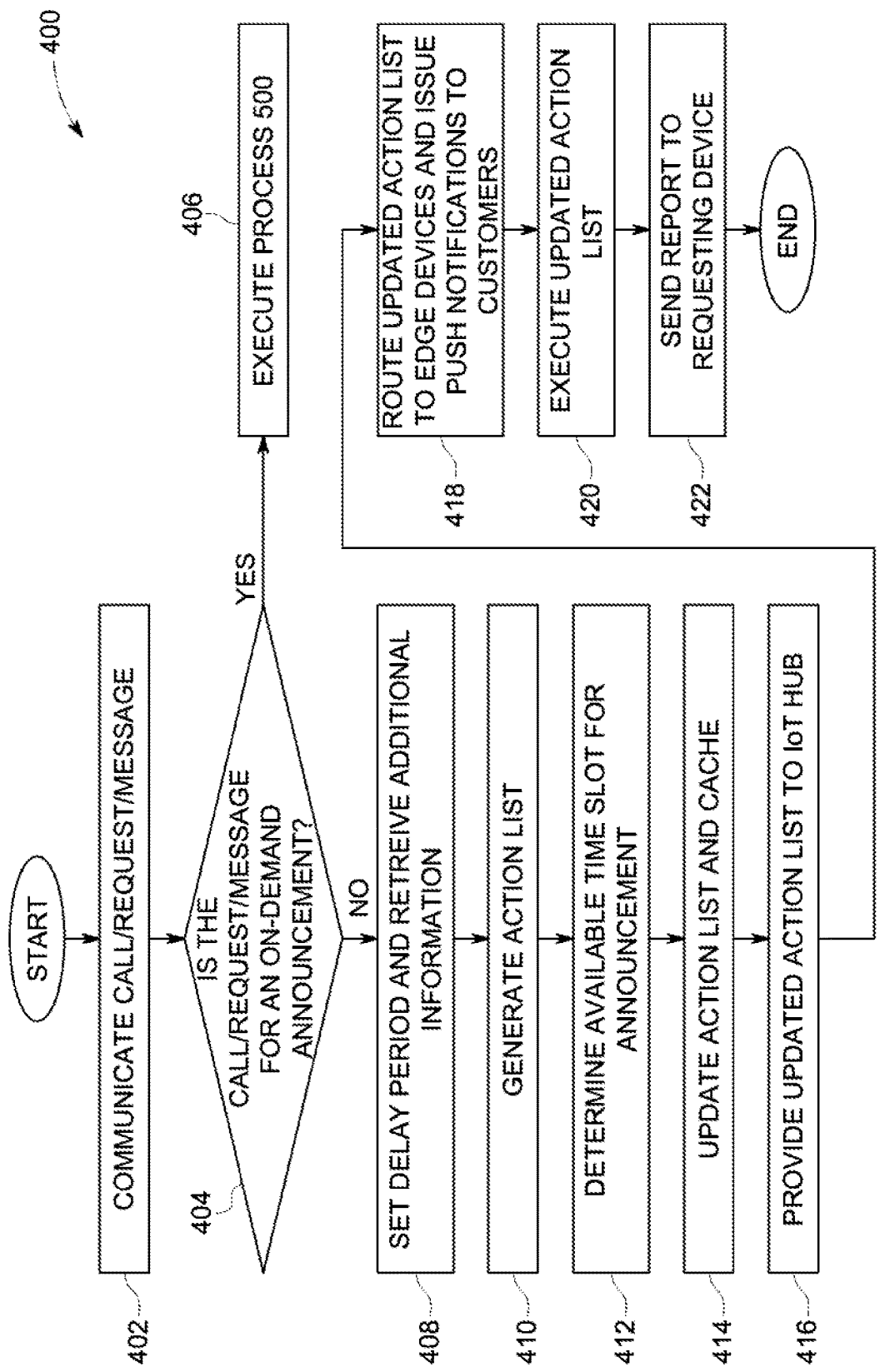
FIG. 4 is a flow chart illustrating a process of rendering a public service announcement in an IoT announcement system.

FIG. 4 is a flow chart illustrating a process 400 of rendering a public service announcement in an IoT announcement system. Process 400 may be implemented using system 100. The process may begin in step 402, where a call/request/message may be communicated to cloud platform/communication network. This call/request/message may be automatically generated by a device requesting an announcement (e.g., user device 104*a*) based on an event and/or may be generated based on input of a user.

Next, in step 404, the system may determine whether the call/request/message is for an on-demand announcement (e.g., a gRPC call or a display string for displaying an announcement) or for an announcement based on prerecorded audio clips (e.g., REST call). If it is determined that the call/request/message is for an on-demand announcement, the process moves to step 406 where process 500 is executed, which will be described in detail in FIG. 5.

Alternatively, if it is determined that the call/request/ message is for generation of an announcement based on prerecorded audio clips, the process moves to step 408, a delay period is set and the set delay period and data in the call/request/message is used to retrieve additional information. For example, rules parser 206 may set a delay period to accompany the eventual announcement and may use the information from the message (e.g., dialect, airport information, event) to retrieve additional information from, for example, database 204. The information may be related to the correct grammar required for the corresponding dialect and corresponding gate information where the public announcement must be rendered. Next, the process moves to step 410 where the delay period, retrieved grammar, gate information, and/or additional information is used to generate an action list. The action list may include, for example, information about playing a chime during delay period followed by an announcement of flight delay in Ron's voice at gate 4 of origin airport and gate 7 of destination airport while also notifying those passengers via text and/or email who have opted in to receive additional notifications.

In step 412, the process determined the next available time the announcement can be made on a particular edge device at the corresponding location (e.g., gate). Next, in step 414, the action list is updated with the available time slot and the cache is updated with the identified timing information in the updated action list. Next, in step 416, the updated action list is provided to IoT Hub that routes the updated action list to the appropriate edge devices and issues additional push notifications corresponding to the announcement based on customer opt-ins (step 418).

Next, the action list is executed (step 420) by the appropriate edge device, which may include retrieving voice clips from a storage (e.g., BLOB storage 212) and/or from a local memory on the edge device. After execution of the action list, a report is sent to the requesting device in step 422. This report may, for example, include information on whether the execution was successful or unsuccessful and may be used to update log files and display screens to notify users or the requesting device on the performance of the system. After this the process may end.

Figure 5:
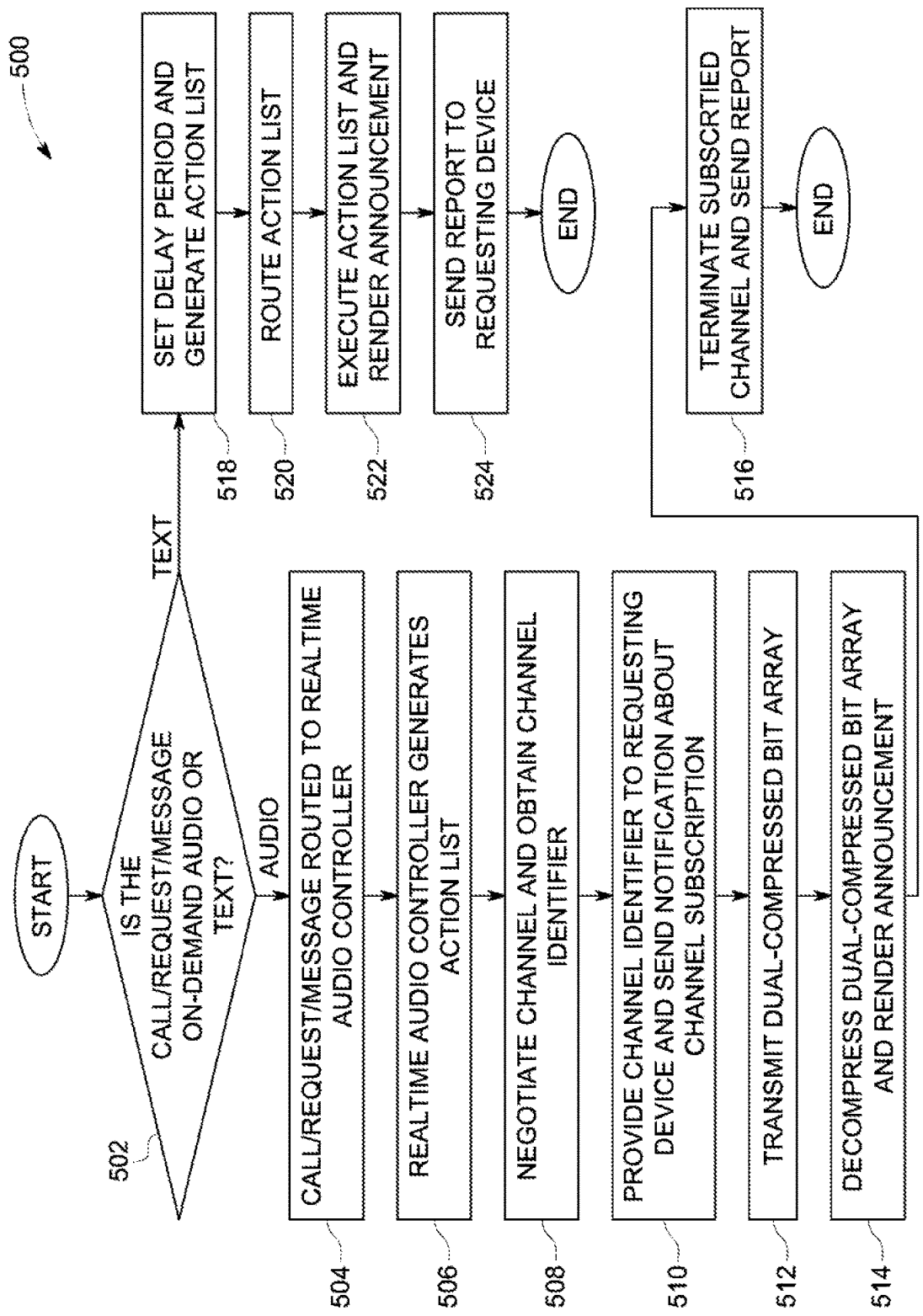
FIG. 5 is a flow chart illustrating a process of rendering an on-demand public service announcement in an IoT announcement system.

FIG. 5 is a flow chart illustrating a process 500 of rendering an on-demand public service announcement in an IoT announcement system. Process 500 may be implemented using system 100. The process may begin in step 502, where it is determined whether the call/request/message is for on-demand audio message and/or for an on-demand text message that must be displayed. If it is determined that the call/request/message is for an on-demand audio message, the process moves to step 504 where the call/request/message is routed to a realtime audio controller. Next, in step 506, the realtime audio controller generates an action list. Next, in step 508 a channel is negotiated and a channel identifier is obtained. For example, IoT Hub 216 may execute the action list and negotiate a channel with realtime audio controller 220 and/or the destination edge device 108a by, for example, generating or obtaining a channel identifier or a subscription identifier.

Once the channel identifier has been obtained, the process moves to step 510 where the channel identifier is provided to the requesting device and a notification is transmitted to realtime audio controller that a channel has been subscribed to. Next, in step 512, the requesting device transmits a dual-compressed bit array that represents the audio file including the announcement. The gRPC message with the dual-compressed byte array may be sent to realtime audio controller 220 and then from realtime audio controller it may go to IoT Hub 216 that may then send it to edge device 108a on the appropriate channel. In the alternative, user device 108a may send it directly to IoT Hub 216 and/or edge device 108a. Next, in step 514, the dual-compressed bit array is decompressed and the audio file is recovered to render the announcement. In step 516, the subscribed channel may be terminated based on a message from the requesting device indicating that now that the bit array has been sent there is no need to maintain the channel any longer and a report may be sent back to the requesting device based on the successful or unsuccessful rendering of the voice announcement to update the tracker log file and to issue appropriate notifications. After which the process may end. As may be apparent to one of ordinary skill in the art the steps shown in processes 400 and 500 need not execute in the order displayed but multiple steps could be happening at the same time and/or in different orders. The sequence is just shown for exemplary purposes. For example, the request to terminate the channel (step 516) may occur in conjunction with the message including the dual-compressed byte array.

Returning now to step 502, if it is determined that the call/request/message is for on-demand text message that must be displayed, the process moves to step 518 where a delay period is set and an action list is generated. As discussed above, the action list may be generated by scheduler 204 and will include the destination information (retrieved from database) and information on an available time slot. Next, in step 520, the action list will be routed either after being updated with the storage location where the text string is stored in the BLOB storage 212 or with a message indicating that the text string can be retrieved from a text to speech platform. As explained above, the action list may be provided to, for example, edge device 108a that is required to render the announcement.

Next, in step 522, the action list will be executed. For example, the action list may be executed by an edge device by retrieving the text string stored in BLOB storage 212 using the storage location information in the action list and/or by retrieving the text string from the text to speech platform based on an indication in the action list that the text string is available in the platform. Either way, executing the action list will cause the public announcement to be displayed on the appropriate screens connected to the edge device. Next, in step 524, a report may be sent back to the requesting device with information on whether the announcement was displayed successfully or unsuccessfully and the tracker log file, announcement screen, and notification may be updated accordingly, and the process may end.

Embodiments of the present disclosure concerning the IoT announcement systems and methods addresses the drawbacks of the prior approaches, using some of the techniques discussed above. In general, the IoT announcement systems and methods in accordance with the embodiments of the present disclosure has at least the following distinguishable features that lead to significant improvements in the current announcement services:

1) Remote management of public service announcements from any location using cloud platform ensures accuracy and efficiency and reduction of the need to have dedicated hardware for each location where a public service announcement needs to be rendered;

2) Automated announcements reduces the chance of errors introduced because of manual execution and ensures consistency;

3) Remotely issuing announcements ensures secure transmission and issuance of announcements reducing the chances of faulty announcements;

4) Using dual-compression ensures preservation of bandwidth on the cloud platform while also maintaining the integrity of the message;

5) Ad-hoc creation and termination of channels also preserves bandwidth and networking resources and does not require a dedicated computer and/or operator per terminal.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable storage medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

For example, an additional feature of the announcement system is an ability to stream from third party streaming services (such as spotify, shoutcast, etc.) into the public service announcement system such that the edge devices may be configured to play music on demand and/or at predetermined intervals. This also allows for other functions to interject the streaming service based on rules and configurations from the central cloud service. For example, the following payload instructions can be executed to play radio on gate 14 of JFK airport:

```
1 {
2 "originlataAirportCode" : "JFK",
3 "gateNumber":"14",
4 "radioValue" : "http://media-ice.musicradio.com:80/CapitalMP3"
5 }
```

Further, event notifications to trigger announcements and other actions can come from the cloud-based messaging system or other alternative decentralized eventing systems such as a blockchain wallet.

Additional peripherals can be triggered/controlled based on the disclosed techniques. For example, a gate status display or security gates at gates can be operated through the same list of actions sent to the edge devices via the cloud based system. An operator may be able to schedule triggering of multiple actions on demand and/or in a predetermined sequence such that music from a third-party service is streamed, followed by an announcement regarding the flight, followed by the changing of a light from red to green and the unlocking of the doors leading to the jet bridge and opening of swinging gates to allow boarding passengers to board. This allows for an run-from-anywhere architecture for most operational devices that utilize the list of actions paradigm. Similarly, the doors may be locked upon completion of boarding via the edge devices and/or on-demand in case of an emergency making it easy to seal the entire airport and/or predetermined geographical region during a safety threat. Essentially, any automated devices at the airport including doors, lights, gates, announcement displays, baggage belts, status lights, flight schedule displays, escalators, automated cleaning systems may be connected to the edge devices and may be controlled by generating and executing an action list.

Figure 6:
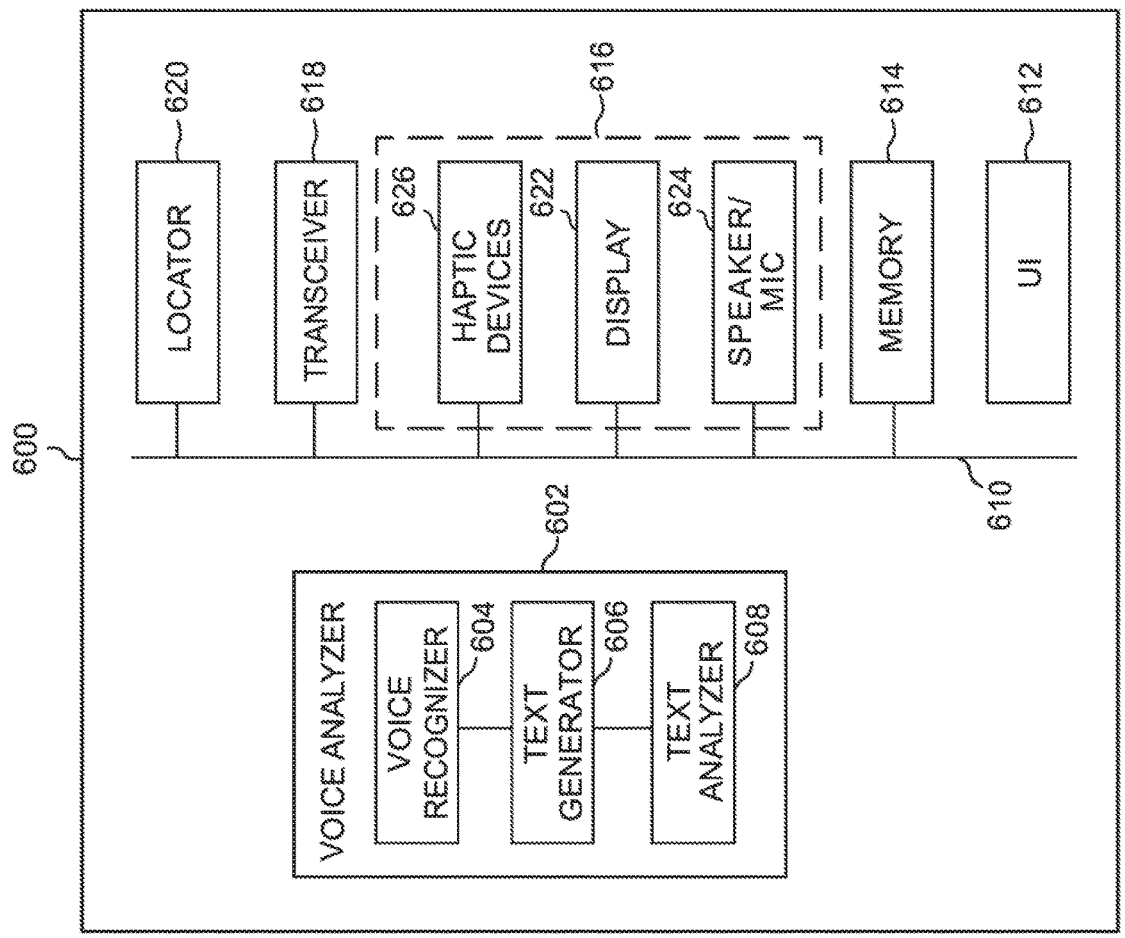
FIG. 6 illustrates a detailed diagram of components in an exemplary user device/edge device of an exemplary server/cloud platform of the IoT announcement service network, consistent with the present invention.

FIG. 6 illustrates an exemplary structure for user device 104a-n in a cloud platform/communication network 102. For example, user devices 104a-n may be implemented via a terminal 600 that may include a voice analyzer 602, a voice recognizer 604, a text generator 606, and a text analyzer 608 in order to assist in real-time generation of announcements in different languages and/or to build them based on topics of interest.

In this additional embodiment, terminal 600 may further include a communication bus 610, a user interface (UI) 612, a transceiver 618, a memory 614, a locator 620, and an outputter 616. The outputter 616 may include a display 622, a speaker 624, and haptic device(s) 626. The user interface 612 may represent any or any combination of a microphone, keyboard, touchscreen, touchpad, and camera, depending on embodiment. In addition, depending on embodiment user interface may further represent a gaze detector or motion input detector, for input by the user. In addition, the memory 614 may store language models for use in the speech recognition, such as by the voice recognizer 604, and other personalization databases (DBs), for example, for use in the determination and storing of topics of interest, categories, keywords, etc. Outputter 616 may further include a topic-of-interest setter.

The voice recognizer 604, according to one or more embodiments, monitors various sounds produced around one or more microphones of the user interface 612 and extracts raw voice data from the sound. At this time, the voice recognizer 604 may utilize voice activity detection (VAD) to initiate voice monitoring, in response to a sound or voice with a volume level greater than a certain predetermined threshold is input. The threshold may be adaptively applied, or set, relative to a monitored ambient noise of the environment.

In addition, in the case where various sounds are input from multiple sound sources, the voice recognizer 604 may identify the same sound source using the determined frequency characteristics of the input sounds. For example, in a noisy airport, the voice recognizer 604 may detect the airport announcement that is a voice of relatively higher amplitude at a constant frequency, and may in turn recognize the speech from the announcement to the exclusion of ambient noises and speech.

The text generator 606, according to one or more embodiments, recognizes speech from the raw voice data extracted by the voice recognizer 604, and generates text from the recognition result.

The text analyzer 608 evaluates the relevance between the generated text and the user's topic(s) of interest. According to the embodiment, the text analyzer 606 may apply either one or both SVM classification and neural network classification to classify the text of the recognized speech, and evaluate the relevance between the classification result of the recognized speech and the user's topic of interest.

According to one or more embodiments, the text analyzer 608 may use SVM classification to classify the generated text into categories by constructing a SVM architecture that defines kernel functions.

As another example, the text analyzer 608 may classify the generated text into categories and keywords through the neural network classification, which is a statistical learning algorithm. In this case, the neural network may be defined by the interconnection pattern between different layers of neurons, a learning process for updating the weights of the interconnections, and the activation function that converts a neuron's weighted input to its output activation.

By using the neural network classification, the text analyzer 608 is able to identify the context which is referred to by the generated text, and may categorize the text corresponding to the identified context. For example, the text analyzer 608 may classify keywords into parent categories and subcategories through text clustering technology. Also, the text analyzer 608 may evaluate the relevance between the classification result of the text and the determined user's topic of interest based on related keywords of each category. The neural network classification is adaptive, and hence is suitable for classifying speech recognition that is otherwise difficult to be dealt with by rule-based programming.

To further elaborate, the text analyzer 608 may divide the generated text into designated linguistic units, such as, morphemes, words, and sentences; identify the context from the generated text; and classify important keywords into categories based on meanings of the respective linguistic units of the text and the statistical probability distribution of frequently used connections. In addition, the text analyzer 608 may determine parent categories and subcategories of the recognized speech by taking into consideration the context of the text and clustering the recognized keywords and the related keywords.

The text analyzer 608 may evaluate the relevance between the generated text and the user's topic of interest, based on at least one of the following factors: the classification result of the text generated from the recognized speech, the presence or absence of the user keywords in the generated text, the number of user keywords in the text, and the number of words in the text relating to the user keywords.

In this case, the text analyzer 608 may reduce chances of any false alarms or inaccurate recognitions by taking into account the number of keywords in the generated text of the recognized speech, and evaluate the relevance between the keywords in the text and the keywords contained in the user's topic of interest. The text analyzer 608 may decide to provide a notification to the user, but only when the analysis result of the generated text shows that the relevance to the user's topics of interest is greater than a threshold.

The transceiver 618 may use any one communication method among LAN, Wi-Fi, Bluetooth, Infrared Data Association (IrDA), HomeRF, Near-Field Communication (NFC), Ultra Wide Band (UWB), ZigBee, Global System for Mobile Communications, Code Division multiple Access (CDMA), Long Term Evolution (LTE), and Wireless Broadband (WiBro), for transmission and/or reception of data. The transceiver 618 may include an antenna for transmitting and receiving communication data as describe in the methods discussed herein. However, the communication method used by the transceiver 618 is not limited thereto, and the transceiver 260 may also use other communication methods for communication between devices.

Figure 7:
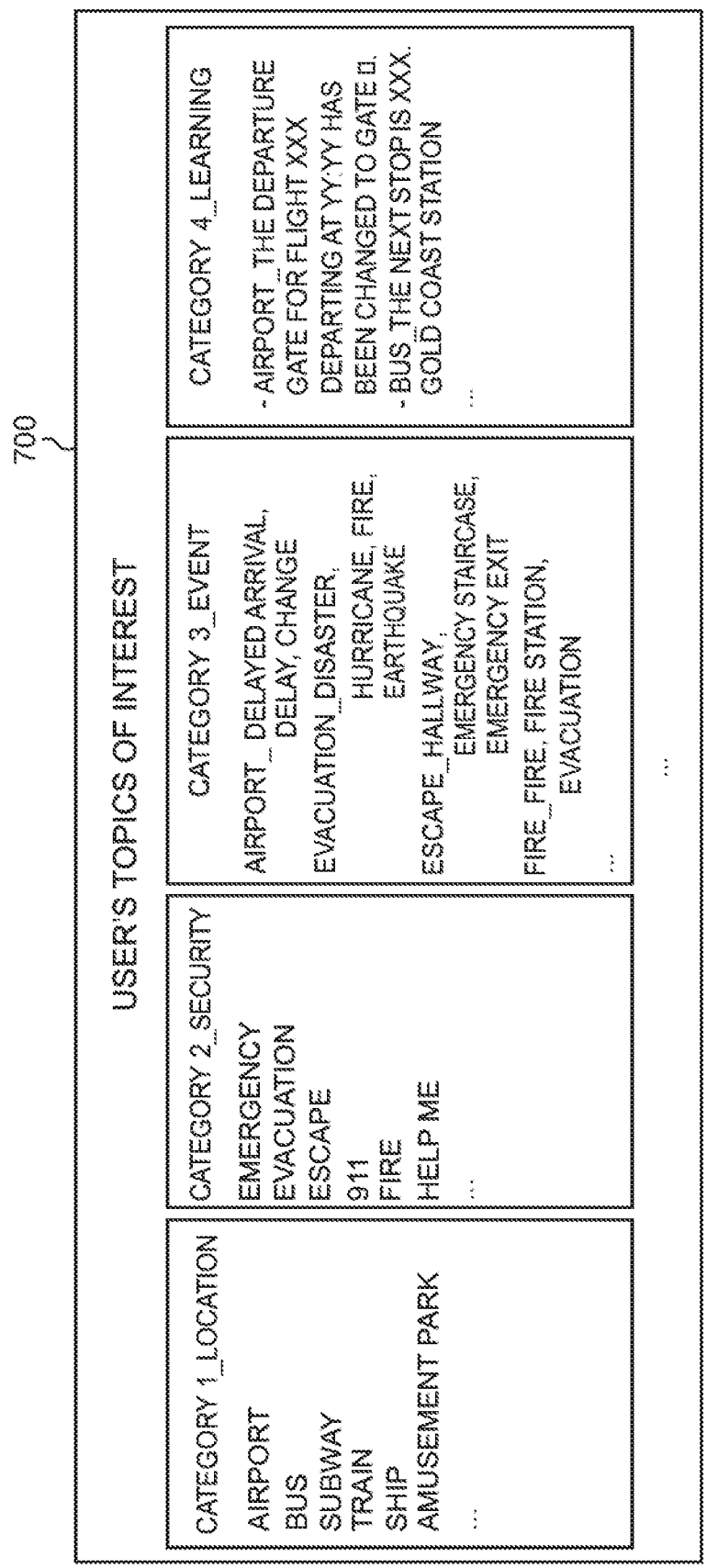
FIG. 7 illustrates exemplary topics of interest and categories corresponding to messages that may be implemented in an exemplary server/cloud platform of the IoT announcement service network, consistent with the present invention.

FIG. 7 illustrates exemplary topics of interest and categories 700 corresponding to messages that may be implemented in an exemplary server/cloud platform of the IoT announcement service network.

These may include parent categories of, for example, "Location," "Security," "Event," and "Learning." According to one or more embodiments, category 1 may be set as "Location" and its subcategories may be set as "Airport," "Bus," "Subway," "Train," "Ship," "Amusement park," etc.

For example, the terminal/user devices 104-*an* may obtain location data from either a GPS or the accessed mobile station, and may achieve location contextual information from the user's current location. User device 104*a-n* may obtain the location contextual information from the current location data and extract categories related to the location and user keywords from the contextual information and decide that the extracted data may be set as the user's topic of interest.

The topic-of-interest may set category 2 as "Security," and set its subcategories as "Emergency," "Evacuation," "Escape," "911," "Fire," "Help me," and so on which may be used to generate an action list to retrieve and/or play different types of public service announcements. For example, keywords related to the security issues may be stored so as to provide a notifications/announcements to passengers when an emergency or urgent situation arises. By doing so, user devices 104*a-n* can provide announcements while monitoring the voices around the apparatus 100 even when the user cannot directly hear the voice related to the security issues from a sound source, thus enabling passengers to be notified of the emergency or urgent situation.

Category 3 may be set as "Event," and correlate each subcategory and user keywords as one set; said set is then designated as the user's topic of interest. For example, the user keywords, such as, a delayed arrival, delays, changes, etc. are correlated with subcategory "Airport." Also, subcategory "Evacuation" may be correlated with user keywords, such as disaster, hurricane, fire, earthquake, and the like. Similarly, category "Escape" may be correlated with user keywords, such as, a hallway, an emergency staircase, an emergency exit, and the like.

In addition, user devices 104*a-n* may set not only user keywords but also commonly used vocabulary as categories. For instance, the sentence "Fire!" can be categorized and may be correlated with user keywords, such as "fire", "fire station", "evacuation", and so on.

According to an embodiment, user devices 104*a-n* may learn the operator's topics of interest based on analysis result of the test speech obtained by the voice analyzer 200. For example, user devices 104*a-n* may recognize the test speech "The departure gate for flight AA123 scheduled to depart at 10 a.m. has been changed to Gate 4" and determine the recognized speech so as to classify it into a specific category and user keywords. Thus, in this case, user devices 104*a-n* may determine a category of the speech as "Airport" and determine "departure gate," "for," "flight," "AA123," "departing," "has been," "changed," "to," "Gate," "4," and so on as the user keywords. While the linguistic unit of a user keyword may be a morpheme, a word, or a sentence, such aspects of the description will not be construed as being limited to the examples set forth herein.

Using these disclosures, the voice recognizer 210 may monitor every surrounding sound and extract a speech signal of the announcement as raw voice data. For example, the voice recognizer 210 may monitor the surrounding sound and extract speech signal of "The departure gate for flight T123 scheduled to depart at 7:30 p.m. has been changed from Gate 2 to Gate 10" as the raw voice data from the airport announcement.

The text analyzer 230 may classify the generated text using a speech classifier, and determine the category to which the recognized speech can entirely belong based on the classification result. Examples of the category may include "Airport," "Subway," "Train," "Ship," "Amusement park," "Fire," "Evacuation," "First-aid," and the like.

In the above example, the text analyzer 230 may divide the text generated from the recognized speech into individual linguistic units, for example: "The/departure gate/for/flight T123/scheduled/to/depart/at/7:30 p.m./has been/changed/from/Gate/No. 2/to/Gate/No. 10" (where slashes "/" indicate linguistic unit divisions). The linguistic unit of division may be a morpheme, a word, a sentence, or the like. However, the linguistic unit is not one that is fixed, and hence the linguistic unit mentioned above may be flexibly applied. Hereinafter, the individual linguistic units are collectively referred to as "keywords."

The text analyzer 230 may use a speech classifier to determine "Airport" category that encompasses keywords, "scheduled," "depart," "Flight T123," "departure gate," and "gate," by clustering related keywords. Through an analysis of airline confirmation, via email, banking or credit card records, out-of-office assistant, travel notices to financial institutions, or other information the user may choose to make available, text analyzer 230 may have certain pre-established information regarding keywords of interest, such as "Gold Coast," "Flight T123," or the like.

In addition, the text analyzer 230 may evaluate the relevance between the generated text of the recognized speech and the designated topic of interest by comparing the category of the classified speech, the related keywords, and the category and user keywords of the user's topic of interest. For example, according to one or more embodiments, such as shown in FIG. 4, the category of the recognized speech and the category of the user's topic of interest are both "airport" and the keywords obtained by text classification (i.e., "scheduled," "depart," "Flight T123," "departure gate," "gate," and "changed,") match the user keywords of the user's topic of interest (i.e., "change," "gate," and "departure gate,"); the text analyzer 230 may thus determine that the recognized speech is relevant to the designated topic of interest. When recognizing the relevance between the recognized speech and the designated topic of interest, the text analyzer 230 may decide to provide a notification to the user.

The system may implement a voice translator that may translate language of the recognized speech into the designated language for the particular location and/or the operator's preferences and generator the corresponding announcement in the appropriate language. For example, when a voice is recognized in Chinese, the voice translator may translate the voice, search through the topics of interest, and generate a corresponding announcement in the default language followed by the same announcement in Chinese to make sure the passengers understand the announcements.

Using a voice recognizer this way, will enable the system 100 to generate announcements based on understanding of the surrounding events even if the announcements are not triggered by the operator. For example, the system will recognize voices in cases of emergencies, determine the appropriate category, generate an action list using the categories, and edge devices 108a-n may receive the most suitable announcements based on the detected circumstances.

What is claimed is:

1. A system for generating and transmitting messages for rendering of announcements on a plurality of edge devices located at a plurality of geographic locations, comprising:
    storage within a cloud-platform storing a collection of audio files;
    a memory including a database storing information including:
        first type of destination information identifying one or more locations of venues where announcements are rendered;
        second type of destination information identifying location information corresponding to the plurality of different geographic locations where the plurality of edge devices are located, wherein the location information identifies locations within the one or more locations of the venues; and
        grammar information including language-specific rules;
    a network interface for receiving messages from one or more of a plurality of requesting devices, the messages including a first type of message and a second type of message;
    a rules parser implemented by a processor and located at a geographic location different from a first geographic location where a first edge device is located, the first edge device corresponding to one of the plurality of edge devices, wherein the rules parser:
        receives a message from a first requesting device via the network interface if the message corresponds to the first type of message, the first type of message including a plurality of fields of information;
        retrieves information stored in the database based on information included in the plurality of fields of the first type of message, the retrieved information including second type of destination information corresponding to the first edge device and grammar information associated with the second type of destination information of the first edge device; and
        generates an action list based on the retrieved information;
    a scheduler determining an available time slot at the first geographic location when the first edge device is available to render an announcement and updating the action list to indicate the determined available time slot;
    an IoT Hub using the grammar information associated with the second type of destination information included in the updated action list to retrieve a corresponding audio file from the collection of audio files stored in the storage and for transmitting the audio file and the updated action list to the first edge device, wherein the updated action list and audio file is used by the first edge device to render an announcement at the determined available time slot based on information included in the updated action list; and
    a real-time audio controller that receives a message from one or more of the plurality of requesting devices via the network interface if the message corresponds to the second type of message, wherein when the real-time audio controller receives the second type of message, the real-time audio controller generates a real-time announcement action list and provides the real-time announcement action list to the IoT Hub,
wherein the IoT Hub:
negotiates a channel with the real-time audio controller and one of the plurality of edge devices;
generates a channel identifier;
provides the channel identifier to the first requesting device or the second requesting device; and
notifies the real-time audio controller that a subscription has been established to the channel,
wherein the real-time audio controller receives a dual-compressed byte array from the first requesting device or the second requesting device, the dual-compressed byte array including audio data and the IoT Hub transmits the dual-compressed byte array to one of the plurality of edge devices with which the channel had been negotiated, wherein the one of the plurality of edge devices decompresses the byte array and renders an announcement using the audio data included in the dual-compressed byte array, and
wherein when the dual-compressed byte array is transmitted to one of the plurality of edge devices, the first requesting device or the second requesting device sends a message to terminate the channel and the channel is terminated by the IoT Hub.

2. The system of claim 1, wherein the first type of message is a REST call.

3. The system of claim 1, wherein the second type of message is a gRPC subscription message.

4. The system of claim 1, wherein the network interface establishes a connection with the first edge device via the Internet.

5. The system of claim 1, wherein the memory corresponds to distributed memory within the cloud-platform.

6. The system of claim 1, wherein when the first type of message corresponds to a predetermined event, the IoT Hub transmits a message to an additional device, the additional device corresponding to a device of a customer and the message describing a delay or change in time associated with an event the customer was scheduled to participate in, the event including a travel or an entertainment event.

7. The system of claim 1, wherein the collection of audio files include audio files of different languages, accents, and/or dialects and the IoT Hub uses the grammar information associated with the second type of destination to retrieve the audio file having a specific type of language, accent, and/or dialect.

8. The system of claim 1, wherein the rules parser sets a delay event to create a distinction between two consecutive announcement being rendered by the first edge device, the delay event corresponding to music, silence, a chime, or a predetermined message.

9. The system of claim 1, wherein the first type of destination information corresponds to an airport, train station, or concert venue and the second type of destination information corresponds to a gate within the airport, train station, or concert venue.

10. The system of claim 1, wherein rendering the announcement at the first edge device includes playing the corresponding audio file on a speaker and displaying a visual message corresponding to the audio file on a screen.

11. The system of claim 1, wherein the IoT Hub implements authentication while transmitting the updated action list to the first edge device.

12. The system of claim 1, wherein when the IoT Hub receives an error from the first edge device when the first edge device is unable to render the announcement and the memory includes a tracker log file to record error information corresponding to the error, the error information included a type of error and a time when the error occurred.

13. The system of claim 1, further comprising:
a content management system for managing information stored in the database; and
an indexer including an index of information stored in the database, wherein the rules parser uses use one or more of the content management system or indexer to retrieve information stored in the database, and the IoT Hub uses one or more of the content management system or indexer to retrieve the corresponding audio file from the collection of audio files stored in the storage.

14. The system of claim 1, wherein the requesting devices corresponds to one or more of a tablet, a computer, and/or a smartphone.

15. The system of claim 1, wherein when the real-time audio controller receives an additional second type of message, the real-time audio controller generates an additional real-time announcement action list and provides the additional real-time announcement action list to the IoT Hub, wherein the IoT Hub:
negotiates an additional channel with the real-time audio controller and one of the plurality of edge devices;
generates an additional channel identifier; provides the additional channel identifier to the first requesting device or the second requesting device; and
notifies the real-time audio controller that an additional subscription has been established to the additional channel, wherein the additional channel and the additional subscription are different from the channel and the channel identifier and are established after termination of the channel when the announcement corresponding to the real-time announcement action list has been processed.

16. The system of claim 15, wherein the real-time audio controller receives an additional dual-compressed byte array from the first requesting device or the second requesting device, the additional dual-compressed byte array including audio data and the IoT Hub transmits the additional dual-compressed byte array to one of the plurality of edge devices with which the additional channel had been negotiated, wherein the one of the plurality of edge devices decompresses the additional byte array and renders an announcement using the audio data included in the additional dual-compressed byte array.

17. The system of claim 1 wherein the dual-compressed byte array is compressed by two compression schemes including gzip compression followed by a protocol buffer compression.

18. The system of claim 1, wherein, the first requesting device or the second requesting device includes:
a microphone;
a voice recognizer that monitor sound produced around one or more microphones and extracts raw voice data when sound is detected;
a text generator that recognizes speech from the extracted raw voice data and generates text from the recognition result;
a text analyzer using neural network classification to identify context information corresponding to the generated text, wherein the context is used to generate the first type of message and the second type of message.

19. A computer-implemented method for generating and transmitting messages for rendering of announcements on a plurality of edge devices located at a plurality of geographic locations, comprising:

storing within a cloud-platform:
  a collection of audio files;
  first type of destination information identifying one or more locations of venues where announcements are rendered;
  second type of destination information identifying location information corresponding to the plurality of different geographic locations where the plurality of edge devices are located, wherein the location information identifies locations within the one or more locations of the venues; and
  grammar information including language-specific rules;
receiving, at the cloud platform, messages from one or more of a plurality of requesting devices, the messages including a first type of message and a second type of message, wherein the first type of message is received from a first requesting device and includes a plurality of fields of information;
retrieving information stored in the cloud-platform based on information included in the plurality of fields of the first type of message, the retrieved information including second type of destination information corresponding to a first edge device and grammar information associated with the second type of destination information of the first edge device;
generating an action list based on the retrieved information;
determining an available time slot at a first geographic location of the first edge device when the first edge device is available to render an announcement;
updating the action list to indicate the determined available time slot;
retrieving, using the grammar information associated with the second type of destination information included in the updated action list, an audio file from the collection of audio files stored;
transmitting the audio file and the updated action list to the first edge device, wherein the updated action list and audio file is used by the first edge device to render an announcement at the determined available time slot based on information included in the updated action list;
generating a real-time announcement action list based on the second type of message;
negotiating a channel with a real-time audio controller and one of the plurality of edge devices;
generating a channel identifier corresponding to the channel;
providing the channel identifier to the first requesting device or the second requesting device;
notifying the real-time audio controller that a subscription has been established to the channel;
receiving a dual-compressed byte array from the first requesting device or the second requesting device, the dual-compressed byte array including audio data;
transmitting the dual-compressed byte array to one of the plurality of edge devices with which the channel had been negotiated, wherein the one of the plurality of edge devices decompresses the byte array and renders an announcement using the audio data included in the dual-compressed byte array; and
terminating the channel when the dual-compressed byte array is transmitted.

20. The computer-implemented method of claim 19, further, comprising implementing authentication while transmitting the updated action list to the first edge device,
  wherein the dual-compressed byte array is compressed by two compression schemes including gzip compression followed by a protocol buffer compression.

* * * * *